United States Patent
Plotkin et al.

(10) Patent No.: US 8,517,008 B2
(45) Date of Patent: Aug. 27, 2013

(54) MODULAR SOLAR RECEIVER PANELS AND SOLAR BOILERS WITH MODULAR RECEIVER PANELS

(75) Inventors: Andrew Plotkin, Worcester, MA (US); Robert Rancatore, Worcester, MA (US); Kevin Toupin, Princeton, MA (US); Russell Ricci, Brookfield, MA (US)

(73) Assignee: Babcock Power Services, Inc., Worcester, MA (US)

( * ) Notice: Subject to any disclaimer, the term of this patent is extended or adjusted under 35 U.S.C. 154(b) by 59 days.

(21) Appl. No.: 13/102,703

(22) Filed: May 6, 2011

(65) Prior Publication Data

US 2011/0209697 A1 Sep. 1, 2011

Related U.S. Application Data

(63) Continuation-in-part of application No. 12/552,724, filed on Sep. 2, 2009, and a continuation-in-part of application No. 13/007,262, filed on Jan. 14, 2011, which is a continuation-in-part of application No. 12/620,109, filed on Nov. 17, 2009, and a continuation-in-part of application No. 12/547,650, filed on Aug. 26, 2009.

(60) Provisional application No. 61/151,984, filed on Feb. 12, 2009, provisional application No. 61/152,011, filed on Feb. 12, 2009, provisional application No. 61/152,035, filed on Feb. 12, 2009, provisional application No. 61/152,049, filed on Feb. 12, 2009, provisional application No. 61/152,077, filed on Feb. 12, 2009, provisional application No. 61/152,114, filed on Feb. 12, 2009, provisional application No. 61/152,286, filed on Feb. 13, 2009.

(51) Int. Cl.
*F24J 2/24* (2006.01)

(52) U.S. Cl.
USPC ........... 126/663; 126/704; 126/651; 126/655; 126/706; 165/173

(58) Field of Classification Search
USPC ................. 126/663, 704, 651, 655, 674, 706; 165/173, 67, 81, 82, 83
See application file for complete search history.

(56) References Cited

U.S. PATENT DOCUMENTS

| | | |
|---|---|---|
| 2,383,234 A | 8/1945 | Barnes |
| 3,197,343 A | 7/1965 | Palmatier |

(Continued)

FOREIGN PATENT DOCUMENTS

| | | |
|---|---|---|
| DE | 10248068 A1 | 5/2004 |
| FR | 2501839 A1 | 9/1982 |

(Continued)

OTHER PUBLICATIONS

U.S. Appl. No. 60/943,096, Kroizer.

(Continued)

*Primary Examiner* — Alfred Basichas
(74) *Attorney, Agent, or Firm* — Edwards Wildman Palmer LLP; Joshua L. Jones

(57) ABSTRACT

A modular panel for a solar boiler includes an inlet header, an outlet header, and a plurality of tubes fluidly connecting the inlet header to the outlet header. The tubes are substantially coplanar with one another forming a solar receiver surface and an opposed internal surface. The panel is modular in terms of height, width, number of tubes, and size of tubes, for improved handling of high heat flux and resultant thermally induced stresses.

20 Claims, 6 Drawing Sheets

(56) References Cited

U.S. PATENT DOCUMENTS

| | | |
|---|---|---|
| 3,208,877 A | 9/1965 | Merry |
| 3,325,312 A | 6/1967 | Sonntag, Jr. |
| 3,450,192 A | 6/1969 | Hay |
| 3,459,597 A | 8/1969 | Baron |
| 3,464,402 A | 9/1969 | Collura |
| 3,822,692 A | 7/1974 | Demarest |
| 3,823,703 A | 7/1974 | Lanciault |
| 3,893,506 A | 7/1975 | Laing |
| 3,924,604 A | 12/1975 | Anderson |
| 3,927,659 A | 12/1975 | Blake et al. |
| 3,951,108 A | 4/1976 | Rees |
| 3,968,652 A | 7/1976 | Chevalier |
| 3,991,742 A | 11/1976 | Gerber |
| 3,995,804 A | 12/1976 | Folds et al. |
| 4,003,366 A | 1/1977 | Lightfoot |
| 4,037,639 A | 7/1977 | Jones |
| 4,088,266 A | 5/1978 | Keyes |
| 4,094,147 A | 6/1978 | Alleau et al. |
| 4,112,921 A | 9/1978 | MacCracken |
| 4,120,288 A | 10/1978 | Barrett |
| 4,127,102 A | 11/1978 | Berman |
| 4,127,103 A | 11/1978 | Klank et al. |
| 4,128,096 A | 12/1978 | Katz |
| 4,136,674 A | 1/1979 | Korr |
| 4,191,246 A | 3/1980 | Cassell |
| 4,204,523 A | 5/1980 | Rothe |
| 4,205,658 A | 6/1980 | Clark |
| 4,210,122 A | 7/1980 | Artweger |
| 4,215,676 A | 8/1980 | Gilliam |
| 4,237,861 A | 12/1980 | Fayard et al. |
| 4,245,618 A | 1/1981 | Wiener |
| 4,253,801 A | 3/1981 | O'Hare |
| 4,257,477 A | 3/1981 | Maloney |
| 4,261,330 A | 4/1981 | Reinisch |
| 4,265,223 A | 5/1981 | Miserlis et al. |
| 4,269,172 A | 5/1981 | Parker et al. |
| 4,273,100 A | 6/1981 | Cogliano |
| 4,280,483 A | 7/1981 | Schaffer |
| 4,289,114 A | 9/1981 | Zadiraka |
| 4,296,730 A | 10/1981 | Zadiraka |
| 4,296,733 A | 10/1981 | Saunders |
| 4,312,687 A | 1/1982 | Sigworth, Jr. |
| 4,313,304 A | 2/1982 | Hunt |
| 4,320,663 A | 3/1982 | Francia |
| 4,324,229 A | 4/1982 | Risser |
| 4,338,991 A | 7/1982 | Sigworth, Jr. |
| 4,350,374 A | 9/1982 | Brollo |
| 4,353,356 A | 10/1982 | Vandenbossche |
| 4,359,043 A | 11/1982 | Dominique et al. |
| 4,367,726 A | 1/1983 | Maes, Jr. |
| 4,371,035 A | 2/1983 | Soligno |
| 4,373,512 A | 2/1983 | Hirt |
| 4,380,996 A | 4/1983 | Mengeringhausen |
| 4,384,550 A | 5/1983 | Miller |
| 4,394,859 A | 7/1983 | Drost |
| 4,404,960 A | 9/1983 | Laing |
| 4,416,265 A | 11/1983 | Wallace |
| 4,428,361 A | 1/1984 | Straza |
| 4,432,341 A | 2/1984 | Howe et al. |
| 4,454,863 A | 6/1984 | Brown et al. |
| 4,485,803 A * | 12/1984 | Wiener ........................ 126/591 |
| 4,503,903 A | 3/1985 | Kramer |
| 4,512,336 A | 4/1985 | Wiener |
| 4,535,755 A | 8/1985 | Roberts |
| 4,569,331 A | 2/1986 | Tani et al. |
| 4,615,381 A | 10/1986 | Maloney |
| 4,653,470 A | 3/1987 | Carli et al. |
| 4,660,630 A | 4/1987 | Cunningham et al. |
| 4,665,894 A | 5/1987 | Juhasz |
| 4,712,338 A | 12/1987 | Trickel |
| 4,768,345 A | 9/1988 | Kardas |
| 4,832,119 A | 5/1989 | Bloor et al. |
| 4,867,133 A | 9/1989 | Sadler |
| 4,946,512 A | 8/1990 | Fukuroi et al. |
| 4,972,806 A | 11/1990 | Marsault |
| 5,163,821 A | 11/1992 | Kelly et al. |
| 5,174,128 A | 12/1992 | Bourne et al. |
| 5,201,282 A | 4/1993 | Albrecht |
| 5,217,000 A | 6/1993 | Pierce-Bjorklund |
| 5,342,016 A | 8/1994 | Marsault et al. |
| 5,368,092 A | 11/1994 | Rearden et al. |
| 5,404,937 A | 4/1995 | Assaf et al. |
| 5,417,052 A | 5/1995 | Bharathan et al. |
| 5,444,972 A | 8/1995 | Moore |
| 5,482,233 A | 1/1996 | Marko et al. |
| 5,694,774 A | 12/1997 | Drucker |
| 5,727,379 A | 3/1998 | Cohn |
| 5,823,176 A | 10/1998 | Harris |
| 5,850,831 A | 12/1998 | Marko |
| 5,857,322 A | 1/1999 | Cohn |
| 5,862,800 A | 1/1999 | Marko |
| 5,881,456 A | 3/1999 | Bergins et al. |
| 5,943,985 A | 8/1999 | Hartman |
| 6,126,120 A | 10/2000 | Quaranta et al. |
| 6,155,339 A | 12/2000 | Grapengater |
| 6,173,927 B1 | 1/2001 | Delsol |
| 6,240,156 B1 | 5/2001 | Matsumoto et al. |
| 6,301,928 B1 | 10/2001 | Tanatsugu et al. |
| 6,434,942 B1 | 8/2002 | Charlton |
| 6,487,859 B2 | 12/2002 | Mehos et al. |
| 6,497,102 B2 | 12/2002 | Liebig |
| 6,532,953 B1 | 3/2003 | Blackmon et al. |
| 6,668,555 B1 | 12/2003 | Moriarty |
| 6,708,687 B2 | 3/2004 | Blackmon, Jr. et al. |
| 6,736,134 B2 | 5/2004 | Marko |
| 6,913,015 B2 | 7/2005 | Pajk |
| 6,926,440 B2 | 8/2005 | Litwin |
| 6,931,851 B2 | 8/2005 | Litwin |
| 7,011,086 B2 | 3/2006 | Litwin |
| 7,600,350 B2 | 10/2009 | Braunstein |
| 7,640,746 B2 | 1/2010 | Skowronski et al. |
| 7,806,377 B2 | 10/2010 | Strizki |
| 2001/0010222 A1 | 8/2001 | Prueitt |
| 2002/0029869 A1 | 3/2002 | Kodumudi et al. |
| 2003/0041856 A1 | 3/2003 | Blackmon et al. |
| 2004/0035111 A1 | 2/2004 | Ven et al. |
| 2004/0112374 A1 | 6/2004 | Litwin |
| 2004/0139961 A1 | 7/2004 | Blackmon et al. |
| 2004/0244376 A1 | 12/2004 | Litwin et al. |
| 2004/0251002 A1 | 12/2004 | Reichle et al. |
| 2004/0255571 A1 | 12/2004 | Fetescu et al. |
| 2005/0016524 A1 | 1/2005 | Broatch |
| 2006/0225863 A1 | 10/2006 | Levin |
| 2006/0260314 A1 | 11/2006 | Kincaid et al. |
| 2007/0089775 A1 | 4/2007 | Lasich |
| 2007/0119718 A1 | 5/2007 | Gibson et al. |
| 2007/0227531 A1 | 10/2007 | Garcia Cors et al. |
| 2007/0295382 A1 | 12/2007 | Oak |
| 2008/0000231 A1 | 1/2008 | Litwin et al. |
| 2008/0022685 A1 | 1/2008 | Zhu |
| 2008/0053523 A1 | 3/2008 | Brown et al. |
| 2008/0078378 A1 | 4/2008 | Zhu |
| 2008/0092551 A1 | 4/2008 | Skowronski |
| 2008/0256953 A1 | 10/2008 | Arkas et al. |
| 2008/0302357 A1 | 12/2008 | DeNault |
| 2009/0014057 A1 | 1/2009 | Croft et al. |
| 2009/0101134 A1 | 4/2009 | Merrett |
| 2009/0107146 A1 | 4/2009 | Lin |
| 2009/0114269 A1 | 5/2009 | Fletcher et al. |
| 2009/0114270 A1 | 5/2009 | Stancel |
| 2009/0199557 A1 | 8/2009 | Bennett |
| 2009/0250051 A1 | 10/2009 | Lata Perez |
| 2009/0260359 A1 | 10/2009 | Palkes |
| 2009/0276993 A1 | 11/2009 | Fedock et al. |
| 2010/0101564 A1 | 4/2010 | Iannacchione et al. |
| 2010/0199978 A1 | 8/2010 | Plotkin et al. |
| 2010/0229853 A1 | 9/2010 | Vandal et al. |
| 2010/0236183 A1 | 9/2010 | Cusson et al. |
| 2010/0258112 A1 | 10/2010 | Viskup, Jr. et al. |
| 2011/0079217 A1 | 4/2011 | Ricci et al. |

FOREIGN PATENT DOCUMENTS

| | | |
|---|---|---|
| JP | 53131309 A | 11/1978 |
| JP | 08326223 A | 12/1996 |
| KR | 20100033178 A | 3/2010 |
| WO | WO-2008154599 A1 | 12/2008 |

OTHER PUBLICATIONS

International Search Report and Written Opinion, dated Aug. 30, 2010 for PCT/US2010/023124.

International Search Report and Written Opinion, dated Aug. 31, 2010 for PCT/US2010/023165.

International Search Report and Written Opinion, dated Oct. 13, 2010 for PCT/US2010/023622.

International Search Report and Written Opinion, dated Oct. 13, 2010 for PCT/US2010/023826.

International Search Report and Written Opinion, dated Dec. 13, 2010 for PCT/US2010/023367.

International Search Report and Written Opinion, dated Dec. 13, 2010 for PCT/US2010/023500.

International Preliminary Report on Patentabilty for PCT/US2010/023367, dated Aug. 16, 2011.

International Search Report, dated Nov. 23, 2013 for PCT/US2012/035833.

* cited by examiner

MODULAR SOLAR RECEIVER PANELS AND SOLAR BOILERS WITH MODULAR RECEIVER PANELS

CROSS-REFERENCE TO RELATED APPLICATIONS

This application is a continuation in part of U.S. patent application Ser. No. 13/007,262 filed Jan. 14, 2011, which is a continuation in part of each of U.S. patent application Ser. No. 12/620,109 filed Nov. 17, 2009 and U.S. patent application Ser. No. 12/547,650 filed Aug. 26, 2009. This application is also a continuation in part of U.S. patent application Ser. No. 12/552,724, filed Sep. 2, 2009.

Each of Said U.S. patent application Ser. Nos. 12/547,650, 12/552,724, and 12/620,109 claims priority to U.S. Provisional application No. 61/151,984, filed Feb. 12, 2009, to U.S. Provisional application No. 61/152,011, filed Feb. 12, 2009, to U.S. Provisional application No. 61/152,035, filed Feb. 12, 2009, to U.S. Provisional application No. 61/152,049, filed Feb. 12, 2009, to U.S. Provisional application No. 61/152,077, filed Feb. 12, 2009, to U.S. Provisional application No. 61/152,114, filed Feb. 12, 2009, and to U.S. Provisional application No. 61/152,286, filed Feb. 13, 2009. Each of the patent applications above is incorporated by reference herein in its entirety.

BACKGROUND OF THE INVENTION

1. Field of the Invention

The present invention relates to solar power production, and more particularly to solar boilers and solar receiver panels for solar boilers.

2. Description of Related Art

Solar power generation has been considered a viable source to help provide for energy needs in a time of increasing consciousness of the environmental aspects of power production. Solar energy production relies mainly on the ability to collect and convert energy freely available from the sun and can be produced with very little impact on the environment. Solar power can be utilized without creating radioactive waste as in nuclear power production, and without producing pollutant emissions including greenhouse gases as in fossil fuel power production. Solar power production is independent of fluctuating fuel costs and does not consume non-renewable resources.

Solar power generators generally employ fields of controlled mirrors, called heliostats, to gather and concentrate sunlight on a receiver to provide a heat source for power production. A solar receiver typically takes the form of a panel of tubes conveying a working fluid therethrough. Previous solar generators have used working fluids such as molten salt because it has the ability to store energy, allowing power generation when there is no solar radiation. The heated working fluids are typically conveyed to a heat exchanger where they release heat into a second working fluid such as air, water, or steam. Power is generated by driving heated air or steam through a turbine that drives an electrical generator.

More recently, it has been determined that solar power production can be increased and simplified by using water/steam as the only working fluid in a receiver that is a boiler. This can eliminate the need for an inefficient heat exchanger between two different working fluids. This development has lead to new challenges in handling the intense solar heat without damage to the system. In a solar boiler, heat transfer rates can reach levels around 2-3 times the heat transfer rate of a typical fossil fuel fired boiler. This high heat transfer rate intensifies problems related to maintaining even heating and flow distribution throughout known designs of boiler panels. The high heat transfer rate gives rise to high pressures and temperatures in the boiler tubing and related structures. Additionally, in solar boilers, only one side of each boiler tube is heated, while the opposed side is shaded, which gives rise to stresses related to gradients in thermal expansion/contraction. Moreover, since the sun rises and sets each day, solar boilers must undergo a daily thermal expansion/contraction cycle, which can lead to an increase in creep and fatigue damage from the cycling stresses.

In typical boilers, for example coal fired boilers, the heat transfer surfaces, namely the superheater, reheater, and evaporator, are separated with respect to physical location as well as the mode of heat transfer, e.g., convection versus radiation dominant. The separation of heat transfer surfaces is important because each different section contains fluid with different physical properties including temperature, pressure, and quality. This separation allows the different heat transfer surfaces to be individually supported and allows for different thermal expansion rates in each of the different heat transfer surfaces. For example, the evaporative section in a typical boiler takes the shape of a quadrilateral, with rigid supports on the centerline of each wall and fixed welds on each corner. This is possible because each side of the boiler will expand at a constant and equal rate, since each side has the same steam conditions and experiences similar heat flux. When the boiler heats up and grows, the quadrilateral evaporative section expands without adding additional stress on the evaporative panels.

In contrast, solar boilers often have heat transfer surfaces that are integral, adjacent, or stacked on top of one another, meaning the heat transfer surfaces are within close proximity to one another. Moreover, each individual heat transfer surface can have extremely different heat flux inputs, steam temperatures, and metal temperatures, due to the uneven distribution of solar energy. If a traditional method of supporting the panels is used, as in traditional coal fired boilers, for example, the large variation in thermal expansion would cause the panels to pull themselves apart.

While the known systems of solar power production have generally been considered satisfactory for their intended purposes, there has remained a need in the art for solar boilers and solar boiler panels that can better accommodate the heat and stress related to solar power production. There also has remained a need in the art for such solar boilers and solar boiler panels that are easy to make and use. The present invention provides a solution to these problems.

SUMMARY OF THE INVENTION

The subject invention is directed to new and useful modular panels for solar boilers. In accordance with an exemplary embodiment, the panel includes an inlet header, an outlet header, and a plurality of tubes fluidly connecting the inlet header to the outlet header. The tubes are substantially coplanar with one another forming a solar receiver surface and an opposed internal surface.

In certain embodiments, each tube has an outer diameter in a range including about two inches and smaller. Each tube can have an outer diameter in a range including about one and a half inches and smaller, about one inch and smaller, or about one half of an inch.

In accordance with certain embodiments, the tubes have a pressure drop in a range including about 19 psi to about 275 psi. The tubes can have a pressure drop in a range including about 25 psi and about 75 psi. Each of the tubes can have a thickness from its inner diameter to its outer diameter in a range of about 0.135 inches to about 0.220 inches. The tubes of the panel can number in a range from about 50 to about 200, or from about 100 to about 150.

The invention also provides a solar boiler. The solar boiler includes a plurality of modular panels as described above, wherein the tubes have a thermal conductivity in a range of about 10 BTU/(hr·ft·F) and higher, which can be about 15 BTU/(hr·ft·F) or higher. In certain embodiments, the tubes include a T91 alloy. The tubes can include any other suitable alloy or alloys, for example, 178C, 192, 210A1, 210C, T1, T2, T11, T12, T22, T9, 304H, 310H, 316H, 321H, and/or 347H. The headers can include any suitable type of steel or other suitable material. It is also contemplated that the solar boiler can include a drum for distributing steam from a steam generator portion of the modular panels to a superheater portion of the modular panels, and piping fluidly connecting the drum to the steam generator and superheater portions of the modular panels.

The invention also includes a solar boiler including a steam generator having a plurality of steam generator panels and a superheater having a plurality of superheater panels, the panels being in fluid communication with a boiler fluid circuit. Each of the steam generator and superheater panels is a separate modular panel as described above. The tubes of the superheater panels have a smaller diameter than the tubes of the steam generator panels. In accordance with certain embodiments, the superheater has a pressure drop in a range including about 200 psi and lower. It is also contemplated that the superheater can be configured to have a pressure drop in a range including about 275 psi and lower, about 175 psi and lower, about 150 psi and lower, about 125 psi and lower, about 100 psi and lower, or about 50 psi and lower.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
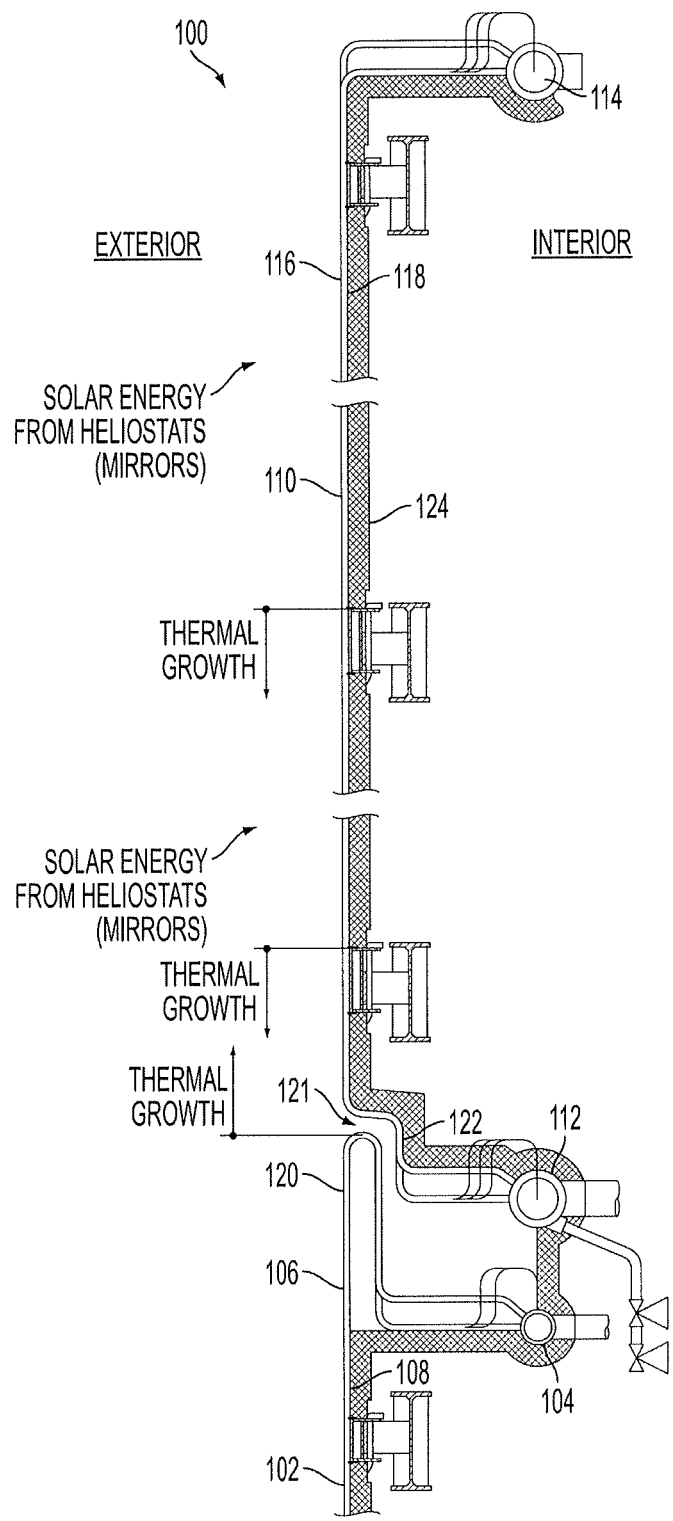
FIG. 1 is a side elevation view of an exemplary embodiment of a modular solar boiler panel constructed in accordance with the present invention, showing the inlet and outlet headers, with the solar receiver surface of an adjacent panel covering the inlet header.

Reference will now be made to the drawings wherein like reference numerals identify similar structural features or aspects of the subject invention. For purposes of explanation and illustration, and not limitation, a partial view of an exemplary embodiment of a modular solar boiler panel in accordance with the invention is shown in FIG. 1 and is designated generally by reference character 100. Other embodiments of solar boilers in accordance with the invention, or aspects thereof, are provided in FIGS. 2-6, as will be described. The systems and methods of the invention can be used to better accommodate and/or reduce thermally induced stresses in solar boiler panels.

In accordance with the present invention, the heat transfer or receiver surfaces of solar boilers are broken down into smaller segments as modular receiver panels, which can expand and contract independently, alleviating thermally induced stresses and thereby alleviating the problems in the traditional solar boiler tubing described above. Referring now to FIG. 1, there are shown features of a solar boiler 100 constructed in accordance with the present invention. Boiler 100 for a solar receiver includes a first boiler panel 102 (the lower panel in FIG. 1, which is only partially shown) having a plurality of substantially coplanar tubes fluidly connecting an inlet header 113 of the first boiler panel (not shown in FIG. 1, but see FIG. 2) to an outlet header 104 of first boiler panel 102. The tubes of first boiler panel 102 form a first solar receiver surface 106 and a first internal surface 108 opposite first solar receiver surface 106. The exterior receiver surface 106 receives solar energy, for example from a field of heliostats, as indicated by arrows in FIG. 1. Those skilled in the art will readily appreciate that having the tubes be coplanar is advantageous to heating each tube evenly, but that non-coplanar arrangements can also be used without departing from the spirit and scope of the invention.

A second boiler panel 110 (the upper panel shown in FIG. 1) similarly includes a plurality of tubes fluidly connecting an inlet header 112 of panel 110 to an outlet header 114 of panel 110. The tubes of panel 110 form a second solar receiver surface 116 and a second internal surface 118 opposite second solar receiver surface 116 (i.e. exterior and interior surfaces, as indicated in FIG. 1). Like receiver surface 106, exterior receiver surface 116 receives solar energy, for example from a field of heliostats, as indicated by arrows in FIG. 2.

First and second boiler panels 102 and 110 are adjacent one another with an upper end portion 120 of panel 102 and the corresponding end portion of surface 106 overlapping a lower end 122 of panel 110 to reduce or prevent solar radiation passing in between the first and second solar receiver surfaces 106 and 116 into the interior space of boiler 100. Interior surfaces 108 and 118 have a layer of insulating material 124 to protect the interior space of boiler 100 and components therein from the high temperatures on the backside of the tubes.

As indicated by arrows in FIG. 1, the overlap region between panels 102 and 110 allows for thermal expansion and contraction of the panels. There is a gap 121 between end portion 120 of panel 102 and end portion 122 of panel 110. As can be seen in FIG. 1, gap 121 is labyrinthine and thus any leakage of solar radiation is absorbed by the boiler tubes, e.g., in end portion 122, and is not allowed to penetrate the interior space of boiler 100. Since end 120 of panel 102 and end 122 of panel 110 are spaced apart from one another, panels 102 and 110 can move relative to one another during the thermal expansion and contraction that results, for example, from the daily cycle of solar radiation incident on the receiver area of boiler 100. Thus, while gap 121 accommodates thermal expansion and contraction, in terms of leakage of solar radiation there is effectively no gap between panels 102 and 110.

Figure 2:
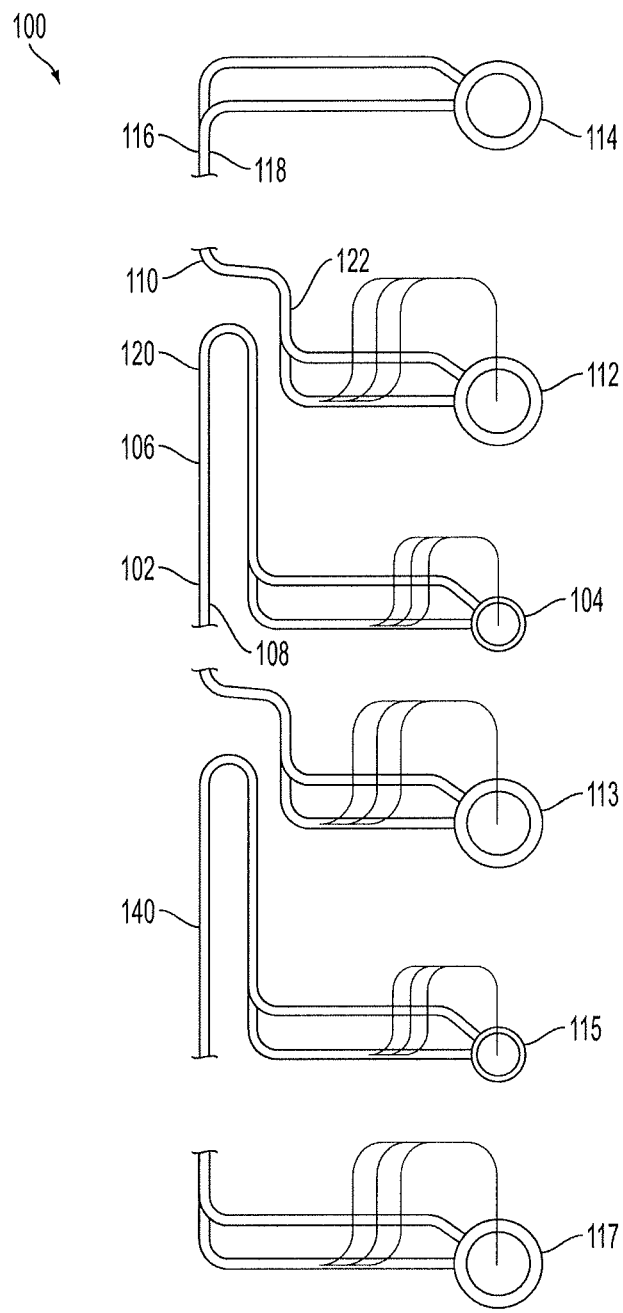
FIG. 2 is a side elevation view of header portions of exemplary embodiments of vertically adjacent steam generator, superheater, and reheater panels constructed in accordance with the present invention, showing the vertical spacing for accommodating thermal expansion and contraction of the panels.
Figure 3:
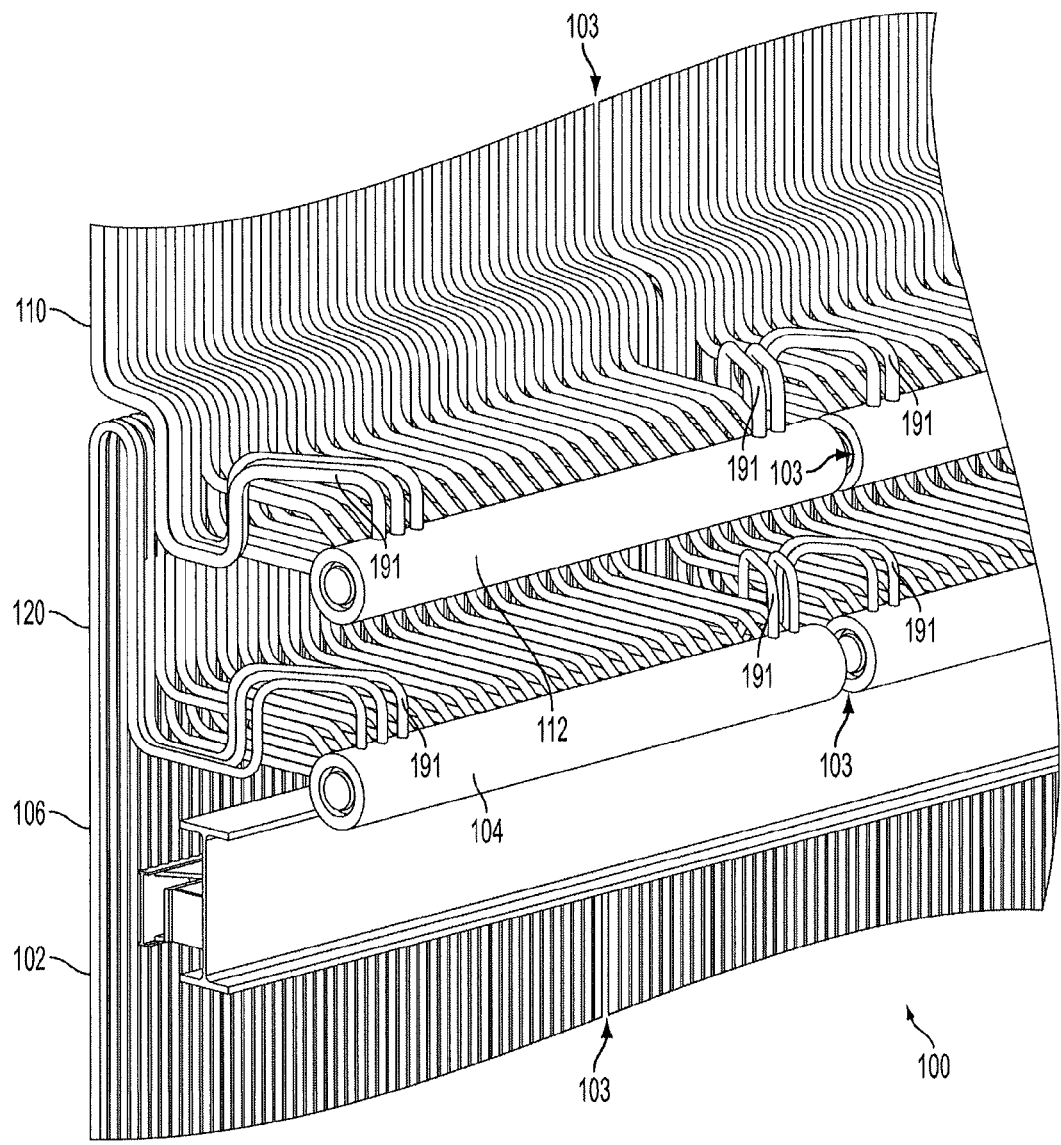
FIG. 3 is a perspective view of a portion of the modular solar boiler panel of FIG. 1, showing the inlet header and headers of adjacent panels arranged to accommodate thermal expansion and contraction in the panels.
Figure 4:
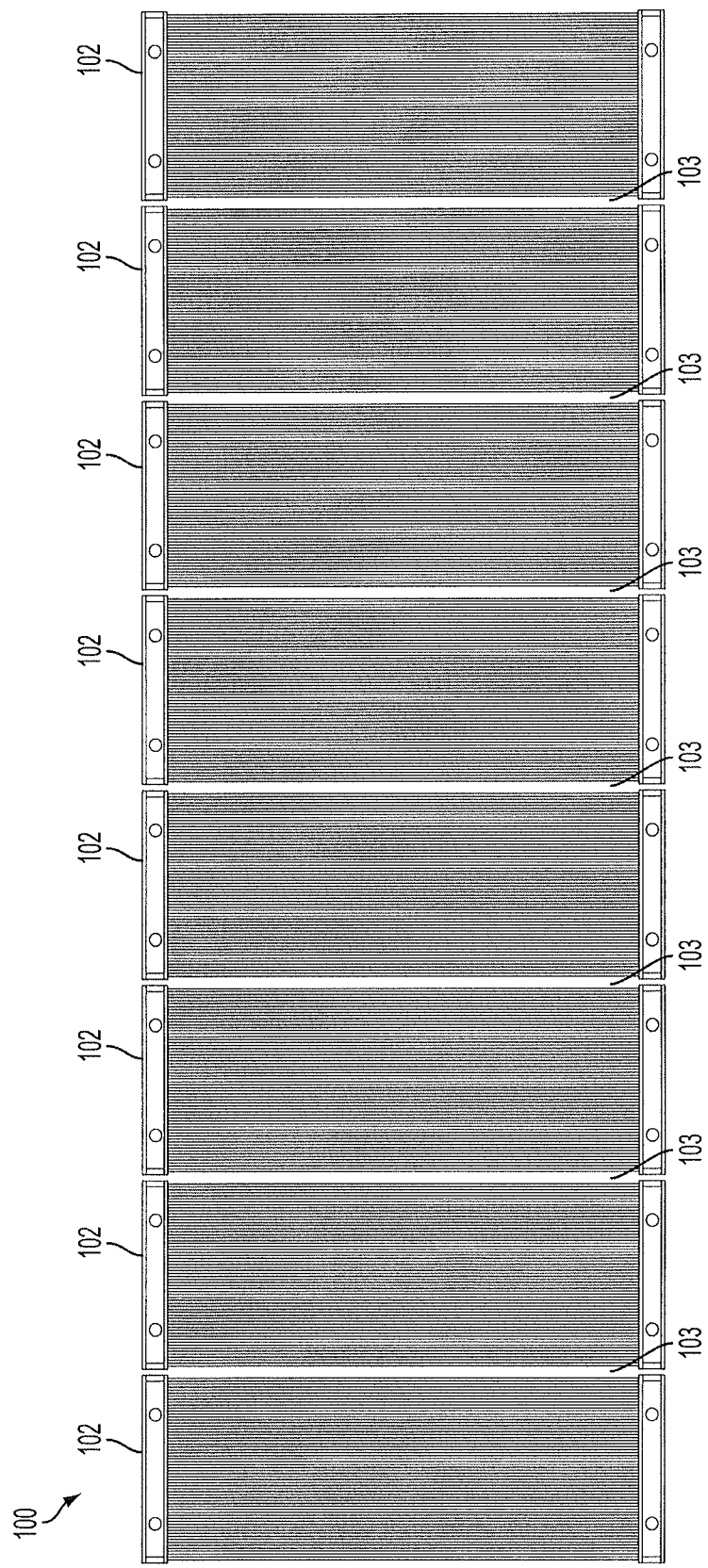
FIG. 4 is an interior elevation view of a plurality of panels of FIG. 1, showing the panels as when mounted to a solar boiler to form a wall thereof, with the panels arranged side by side with spacing to accommodate thermal expansion and contraction in the horizontal direction.
Figure 5:
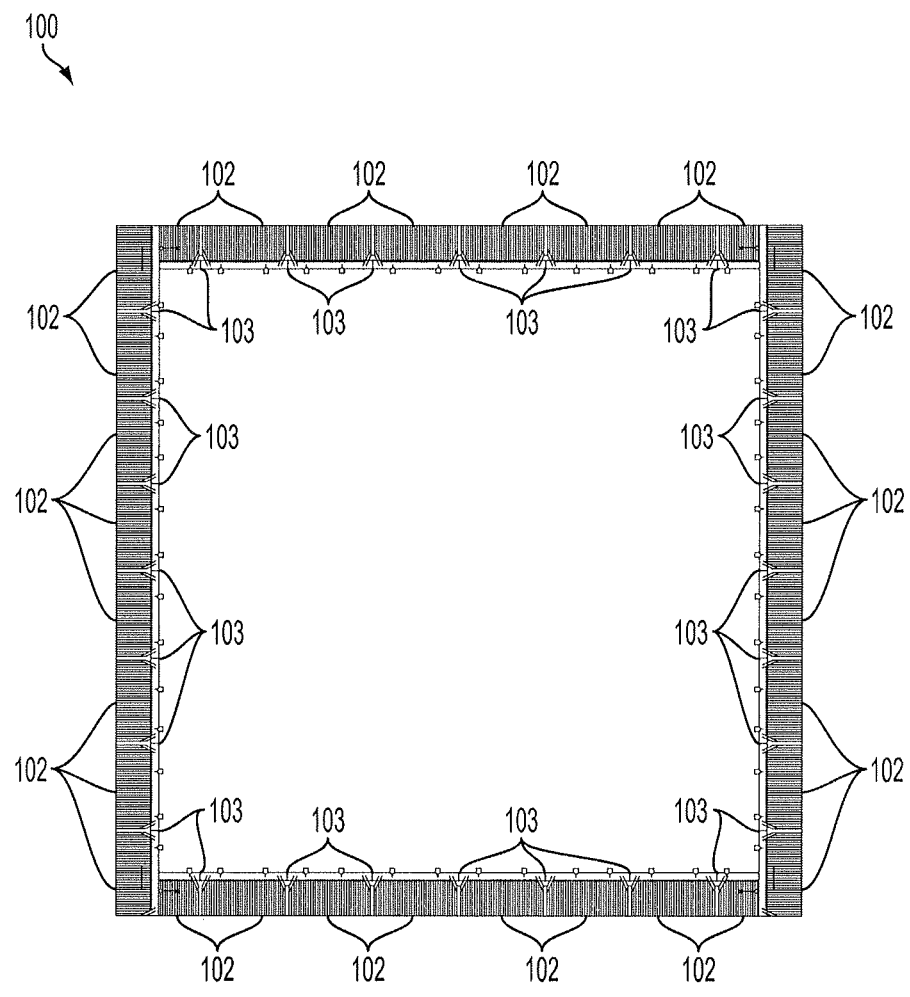
FIG. 5 is a plan view of the solar boiler of FIG. 4, showing four boiler walls surrounding an interior boiler space.

With reference now to FIG. 2, panel 102 is a steam generator panel and panel 110 is a superheater panel. Boiler 100 also includes reheater panels 140. Each reheater panel 140 includes a plurality of tubes fluidly connecting an inlet header 117 to an outlet header 115, much as described above with respect to panels 102 and 110. Panel 140 overlaps panel 102 in the same manner as panel 102 overlaps panel 110 as described above. It is to be understood that boiler 100 includes multiple, parallel panels of each type, as indicated in FIGS. 3-5. Multiple sets of overlapped panels 102, 110, and 140 can be arranged closely together side by side to form a boiler wall, as shown in FIG. 4. As shown in FIG. 5, multiple boiler walls can be joined, for example to form a four-sided or multi-sided boiler capable of receiving concentrated solar energy from heliostats surrounding the base of the boiler. While described herein in the context of a three-stage boiler, those skilled in the art will readily appreciate that any suitable number of stages can be used, and can be arranged in any suitable manner without departing from the spirit and scope of the invention.

FIGS. 1 and 2 have been described above as showing how boiler panels 102, 110 accommodate thermal expansion and contraction in the vertical direction. Referring now to FIG. 3, boiler panels 102, 110 are also configured to accommodate thermal expansion and contraction in the horizontal direction due to their modular configuration. The modular configuration of panels 102, 110 gives them a relatively small width with respect to the whole solar boiler 100. There are two or three end tubes 191 on each end of headers 112 and 104. End tubes 191 are bent inward to shorten the overall length of the respective headers 112 and 104, and the same applies to headers 113, 114, 115, and 117, which are not shown in FIG. 3, but see FIG. 2. FIG. 4 shows one set of boiler panels 102, wherein eight boiler panels 102 are placed closely together side by side as when forming the superheater portion of a solar boiler wall. FIG. 5 shows four such walls from above, with the four walls surrounding a boiler interior space. Each of FIGS. 3-5 show vertical gaps 103 between panels 102, which allow for individual boiler panels 102 to expand and contract independently with respect to neighboring panels. It is advantageous for gaps 103 to nearly or completely close as panels 102 expand during operation, so as to make the best use of the solar radiation delivered to the receiver area, and to protect the interior boiler space as described above.

As indicated in FIG. 3, each boiler panel 102 includes 52 tubes. It is contemplated, however, that any suitable number of tubes can be used for a given application without departing from the spirit and scope of the invention. For example, the tubes of the panel can number in a range from 50 to 200, or for a superheater panel, for example, in a range from 100 to 150. Using smaller tube sizes allows for a greater number of tubes in a panel of a given width, and/or allows for smaller panel widths with a given number of tubes. Tube size is discussed in greater detail below.

Having a limited number of tubes allows for limited panel width. Moreover, by utilizing multiple passes, and by accommodating thermal expansion/contraction in the vertical direction as described above, the panels can have a limited height. Solar boiler configurations with multiple passes are described in greater detail in commonly owned, co-pending U.S. patent application Ser. No. 13/007,262, filed Jan. 14, 2011, which is incorporated by reference herein in its entirety. Limiting the height and width of the panels is a key to making the panels modular and achieving the advantages described herein. For example, if panel width is less than 7 feet, 8 inches, it is possible to ship such panels in a standard shipping container having an inner width of 7 feet, 8 inches.

The particularly high heat fluxes and heating characteristics of solar power production, and the high stress values generated, coupled with the fact that the boiler cycles daily, present a unique challenge in heat transfer tube design. The materials and configuration described herein are capable of reducing the amount of stress present within a given tube while also minimizing the effect of creep and creep/fatigue damage. The tubes of boiler 100 utilize specific materials that are resistant to creep and creep/fatigue damage such as chromoly steels. Exemplary creep resistant materials for this application include chromoly alloys such as T11, T12, T22, T9, and T91, as well as austenitic stainless steel alloys such as 304H, 310H, 316H, 321H, and 347H.

Another important factor in reducing thermally induced stresses in the tubes and other components of boiler 100 is to utilize materials having a high thermal conductivity. Accepted wisdom with respect to boiler tube material selection dictates that in typical boiler design (e.g. fossil fuel plants), tube materials are selected solely on their strength. However, it has been determined in accordance with the present invention that due to the high heat flux of the solar boiler application, special consideration of tube material is advantageous in not only considering the strength of material, but also considering thermal conductivity of the material as well. Thermal conductivity, which can be expressed in BTU/(hr·ft·F), where 1 BTU/(hr·ft·F)=1.73 W/(m·K), is the property of a material that indicates its ability to conduct heat. The higher the thermal conductivity, the higher the rate of heat flow through the material. In a solar boiler, the heat flux is applied to only the portion of the tube exposed to the concentrated solar radiation, i.e., the exterior facing surface. The shaded part of the tube, i.e., the interior facing surface, receives none of the intense solar radiation. This creates a tendency for the tubes to be hot on the exposed side and relatively cool on the inside. This large thermal gradient results in thermally induced stress within the tubes, since thermal expansion is a function of temperature. An increased thermal conductivity allows the tube to more easily conduct heat from the exposed side to the cool side, helping even out the thermal gradient through the tube and thereby reducing thermally induced stresses.

An advantageous balance is struck between the strength and the thermal conductivity, in accordance with the invention. This goes against the accepted wisdom in the art where tube material is selected according to the stronger the better, since in general stronger materials have lower thermal conductivities. Since the heat must conduct through the wall of the tube, it is advantageous to select a tube material that has a relatively high thermal conductivity (i.e. a low thermal resistance). This is especially true for the superheater and reheater which have a relatively low inside heat transfer coefficient when compared to the steam generator. It has been determined in accordance with the subject invention that in order to effectively transfer the heat through the wall of a tube the thermal conductivity should be at least 10 BTU/hr-ft-° F., and preferably at least 15 BTU/hr-ft-° F. Therefore, the tubing in panels 102 has a thermal conductivity of about 15 BTU/

(hr·ft·F) or higher. Exemplary tube materials with suitable strength and thermal conductivity for this application include chromoly steels, such as those listed above, low carbon steel (e.g., 178C), medium carbon steel (e.g., 192, 210A1, and 210C), and carbon molybdenum alloy steel (e.g., T1 and T2), for example.

The tubing in panels 102 advantageously has a low thermal expansion coefficient. This is beneficial since the intensity of solar radiation incident on the tubes during operation can potentially cause large differences in temperature on the tubing structure. The low thermal expansion coefficient reduces the amount of thermal expansion and contraction the tubes undergo, thereby reducing thermal stress, fatigue, and related effects. Exemplary materials with suitably low thermal expansion coefficients include low carbon steel, medium carbon steel, carbon molybdenum alloy steel, and chromoly steel, for example.

The headers can include a material such as any type of steel or other suitable material. Solar boiler 100 includes a drum for distributing steam from a steam generator portion of the modular panels (e.g., a plurality of panels 102 as in FIG. 2) to a superheater portion of the modular panels (e.g., a plurality of panels 110 as in FIG. 2), and piping fluidly connecting the drum to the steam generator and superheater portions of the modular panels. Suitable drum and piping configurations are shown and described in greater detail in commonly owned, co-pending U.S. Patent Application Publication No. 2010-0199974, and commonly owned, co-pending U.S. Patent Application Publication No. 2010-0199976, each of which is incorporated by reference herein in its entirety.

Given all of the considerations explained above, including the considerations that go contrary to the accepted wisdom the art, the superheater, reheater, and steam generator tubes of boiler 100 are fabricated of T91 steel. T91 steel is an unconventional material for boiler tubing, due at least in part to the availability of materials that are easier to work, i.e., weld, bend, and the like. But in accordance with the invention, T91 steel provides advantageous thermal conductivity and high strength. T91 steel has a relatively low thermal expansion coefficient compared to stainless steel, for example, which would be a material of choice if the accepted wisdom in the art were followed. However, those skilled in the art will readily appreciate that T91 steel is exemplary and that any of the other materials described above, or any other suitable material given the considerations above, can be used without departing from the spirit and scope of the invention.

Another important way of reducing thermally induced stresses in solar boiler tubes is by using tube diameters and wall thicknesses that better handle the thermal gradients and pressures involved. Using tube wall thicknesses that are thinner than in typical boilers, e.g., coal fired boilers, helps to distribute heat more evenly through the tube. This is due to the fact that there is less mass to conduct the heat through in the thinner walled tubes. This is important since in solar boiler applications all of the solar energy is focused on the outside diameter of the tube and must conduct through the metal tube wall into the working fluid. A thicker walled tube equates to increased thermal resistance and worse heat transfer. Utilizing a thin walled tube is advantageous to cooling the tube and heating the working fluid effectively. In order to maintain enough strength to hold the pressures and temperatures present within a solar boiler, however, a minimum tube wall thickness needs to be maintained.

Figure 6:
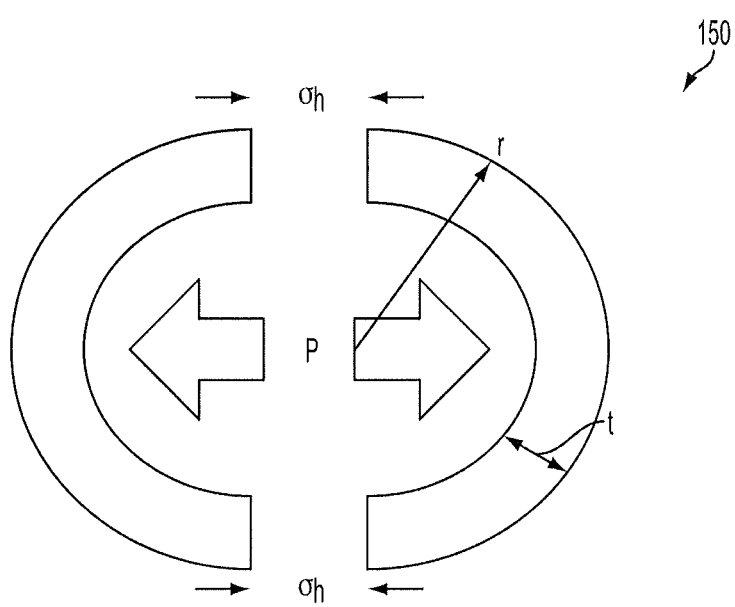
FIG. 6 is a schematic cross-sectional exploded view of an exemplary boiler tube constructed in accordance with the present invention, showing the hoop stress schematically.

Reference is now made to FIG. 6, which schematically depicts hoop stress in an exemplary tube 150 of one of the panels (e.g., boiler panels 102, 110, 140). An advantageous way of reducing the wall thickness is to reduce the outside radius (r) of the tube itself. By reducing the outside radius (r) of the tube, the circumferential stress, or hoop stress ($\sigma_h$), indicated by the small arrows at the cross-sectional cut in FIG. 6, is reduced. Hoop stress ($\sigma_h$) is caused by the force of the internal pressure (P) pushing outward on the inside surface of the tube, as indicated by the large arrows in FIG. 6. Since force is the product of pressure and area, reducing the radius (r) of the tube reduces the amount of surface area that can be acted on by the pressure (P) and therefore reduces the hoop stress ($\sigma_h$) within the tube.

Smaller hoop stresses ($\sigma_h$) mean that a tube can have a thinner wall thickness (t) and still accommodate the Pressure (P). Smaller tube thickness (t) also means each tube uses less material. Since there is less material for the heat to conduct through in a thinner tube, the heat is distributed more evenly than it would be in thicker walled tubes. Thus reducing the tube diameter also reduces thermal gradients and thermally induced stresses.

Smaller tube diameter is advantageous in terms of stress and thermal factors; however, the advantages must be weighed against the fact that pressure drop increases with decreasing tube diameter, and in particularly with decreasing inner diameter. Smaller tubes with smaller cross-sectional flow areas create higher pressure drops than larger diameter tubes. A balance must be struck between pressure drop and thermally induced stress. Boiler 100 uses a tube diameter to balance these conflicting properties that is in the range of ½ inch to 2 inches outside diameter, with a wall thickness correspondingly large enough to maintain the required strength. A suitable range for the wall thickness is from about 0.135 inches to about 0.220 inches. This range of tube diameters and tube wall thicknesses provides ideal conditions for reduction in stress, heat transfer, and pressure drop. The pressure drop with these tube sizes is maintained between 50 and 275 psi. Tube diameter, thickness, and the corresponding pressure drop can be varied from application to application, depending on such elements as piping lengths, number of passes, and the like. For example, for a superheater with panels such as panel 110 having tubing with a 0.75 inch outer diameter and a 0.135 inch wall thickness, the pressure drop is about 125 psi. As another example, for a superheater having tubing with an outer diameter of 0.75 inches and a 0.150 inch wall thickness, the pressure drop is about 175 psi. In another example, for a superheater having tubing with a 0.75 inch outer diameter and a 0.220 inch wall thickness, the pressure drop is about 275 psi. These examples provide pressure drop for the superheater as a whole, based on an exemplary superheater system having panel lengths of 23 feet, 9 inches, four passes, eight panels per pass, and interconnecting piping.

The accepted wisdom in the boiler art dictates that larger tubes, typically greater than two and half inches, should be used in the superheater, reheater, and evaporator, specifically to increase the flow area to decrease the pressure drop. Moreover, the accepted wisdom in the art also dictates that the superheater tubes should have a greater diameter than the steam generator tubes due to the lower density of steam at sub-critical pressures. For example, WO 2008/154599, published Dec. 18, 2008, indicates that steam generation tubes should be 0.5 inches in diameter while the superheating tubes should be 1.0 inches in diameter.

Contrary to the accepted wisdom in the art, in accordance with the subject invention the tubes of panels 102 of the steam generator, sometimes referred to as the evaporator or waterwalls, have an outside diameter in the range of about 1.0 to about 1.5 inches, and the tubes of superheater panels 110 have a smaller diameter than the evaporator tubes, with an outside diameter of about 1.0 inches. The tubes of reheater panels 140 have a larger diameter than the evaporator tubes, with an outside diameter of greater than or equal to about 1.5 inches. The typical heat flux for solar boiler panels is 2-3 times higher than for a conventional (fossil fuel) boiler. It has been determined in accordance with the invention that heat transfer, namely heating the fluids and cooling the tubes, takes priority over reducing pressure drop. Reduced diameter superheater tubes increases the convective heat transfer coefficient inside the tubes, which translates into more cooling of the tube. The increased heat transfer capability allows for an overall boiler size reduction, which allows a given level of power production with fewer heliostat mirrors required.

The systems and methods of the present invention are described herein in the exemplary context of a sub-critical solar boiler. It is also contemplated that the systems and methods of the invention can be practiced on super-critical boilers without departing from the spirit and scope of the invention.

The methods and systems of the present invention, as described above and shown in the drawings, provide for solar boilers and solar boiler panels with superior properties including improved accommodation of thermally induced stresses, ease of construction and maintenance, and improved heat distribution. An additional benefit to smaller or modular construction for solar boiler panels is ease of shipment and ease of constructing sub-assemblies. It also allows for reduced construction effort and easy replacement of only certain panels, or of all the panels as needed.

While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A solar boiler comprising:
   a) a steam generator including a plurality of steam generator panels in fluid communication with a boiler fluid circuit; and
   b) a superheater including a plurality of superheater panels in fluid communication with the fluid circuit; and
   c) a reheater including a plurality of reheater panels in fluid communication with the fluid circuit, wherein each of the steam generator, reheater, and superheater panels is a separate modular panel including:
      i) an inlet header;
      ii) an outlet header; and
      iii) a plurality of tubes fluidly connecting the inlet header to the outlet header, wherein the tubes are substantially coplanar with one another forming a solar receiver surface and an opposed internal surface, and wherein the tubes of the superheater panels have a smaller diameter than the tubes of the steam generator panels, and wherein the tubes of the reheater panels have a larger diameter than the tubes of the steam generator panels.

2. A solar boiler as recited in claim 1, wherein each tube has an outer diameter in a range including about two inches and smaller.

3. A solar boiler as recited in claim 1, wherein each tube has an outer diameter in a range including about one and a half inches and smaller.

4. A solar boiler as recited in claim 1, wherein each tube has an outer diameter in a range including about one inch and smaller.

5. A solar boiler as recited in claim 1, wherein the superheater has a pressure drop in a range including about 275 psi and lower.

6. A solar boiler as recited in claim 1, wherein the superheater has a pressure drop in a range including about 175 psi and lower.

7. A solar boiler as recited in claim 1, wherein the superheater has a pressure drop in a range including about 125 psi and lower.

8. A solar boiler as recited in claim 1, wherein the superheater has a pressure drop in a range including about 50 psi and lower.

9. A solar boiler as recited in claim 1, wherein each of the tubes has a thickness from its inner diameter to its outer diameter in a range of about 0.135 inches to about 0.220 inches.

10. A solar boiler as recited in claim 1, wherein the tubes number in a range from 50 to 200.

11. A solar boiler as recited in claim 1, wherein the tubes have a thermal conductivity in a range of about 15 BTU/(hr·ft·F).

12. A solar boiler as recited in claim 1, wherein the tubes of each modular panel include T91 steel alloy material.

13. A modular panel for a solar boiler as recited claim 12, wherein the tubes number in a range from 100 to 150.

14. A solar boiler as recited in claim 12, wherein each tube has an outer diameter smaller than two inches.

15. A solar boiler as recited in claim 12, wherein the tubes have a thermal conductivity in a range of about 10 BTU/(hr·ft·F) and higher.

16. A solar boiler as recited in claim 12, wherein the tubes have a pressure drop in a range including about 19 psi to about 275 psi.

17. A solar boiler as recited in claim 12, wherein the tubes have a pressure drop in a range including about 25 psi to about 75 psi.

18. A solar boiler as recited in claim 1,
   wherein the tubes of each modern panel have a thermal conductivity in a range of about 10 BTU/(hr·ft·F) and higher.

19. A solar boiler as recited in claim 18, wherein the tubes include a material selected from the group of alloys consisting of 178C, 192, 210A1, 210C, T1, T2, T11, T12, T22, T9, T91, 304H, 310H, 316H, 321H, and 347H.

20. A solar boiler as recited in claim 1, wherein the tubes of the steam generator panels have an outer diameter in a range of about 1.0 to 1.5 inches, wherein the tubes of the superheater panels have an outside diameter of about 1.0 inches, and wherein the tubes of the reheater panels have an outside diameter of greater than or equal to about 1.5 inches.

* * * * *